INVENTOR
ROBERT K. HOPKINS
BY Virgil F. Davis
ATTORNEY

INVENTOR
ROBERT K. HOPKINS
BY Virgil F. Danco
ATTORNEY

Patented Feb. 27, 1940

2,191,482

UNITED STATES PATENT OFFICE 2,191,482

METHOD FOR MANUFACTURING COMPOSITE METAL ARTICLES

Robert K. Hopkins, West New Brighton, Staten Island, N. Y., assignor to The M. W. Kellogg Co., New York, N. Y., a corporation of Delaware Application October 29, 1938, Serial No. 237,658

4 Claims. (Cl. 22—203)

This invention relates in general to the manufacture of composite metal articles and in particular to the manufacture of composite articles made up of a metal base of one composition coated with a thickness of metal of a different composition having properties and characteristics superior to those of the metal of the base in the intended service.

This application is a continuation in part of my application Serial No. 182,461 filed December 30, 1937.

It is an object of this invention to provide a novel method for manufacturing composite metal bodies in which any portion of the coating material, regardless of its thickness, is united to its portion of the base metal in a single continuous operation.

It is also an object of this invention to provide a novel method for manufacturing composite metal bodies in which the surface of the base metal to which the coating is to be united is disposed substantially vertically during the coating operation and the coating metal deposition against the vertically disposed surface carried on continuously whereby defects due to shrinkage during the solidification of the coating can appear only at and adjacent the top edge of the composite body.

It is also a further object of the invention to provide a novel method for manufacturing composite metal bodies by the fusion of the base and coating metals together under the influence of the discharge of electric current in which all, or a part of both of the metals are in the solidified and substantially final condition prior to union of the metals.

The above and the further objects and advantages of the invention will be apparent from a consideration of the following description of present preferred modes of carrying the invention out in practice taken with the accompanying drawings, in which Fig. 1 is a front sectional view taken along lines 1—1 of Fig. 2 showing a form of apparatus at present found suitable for carrying out the invention.

Figure 1:
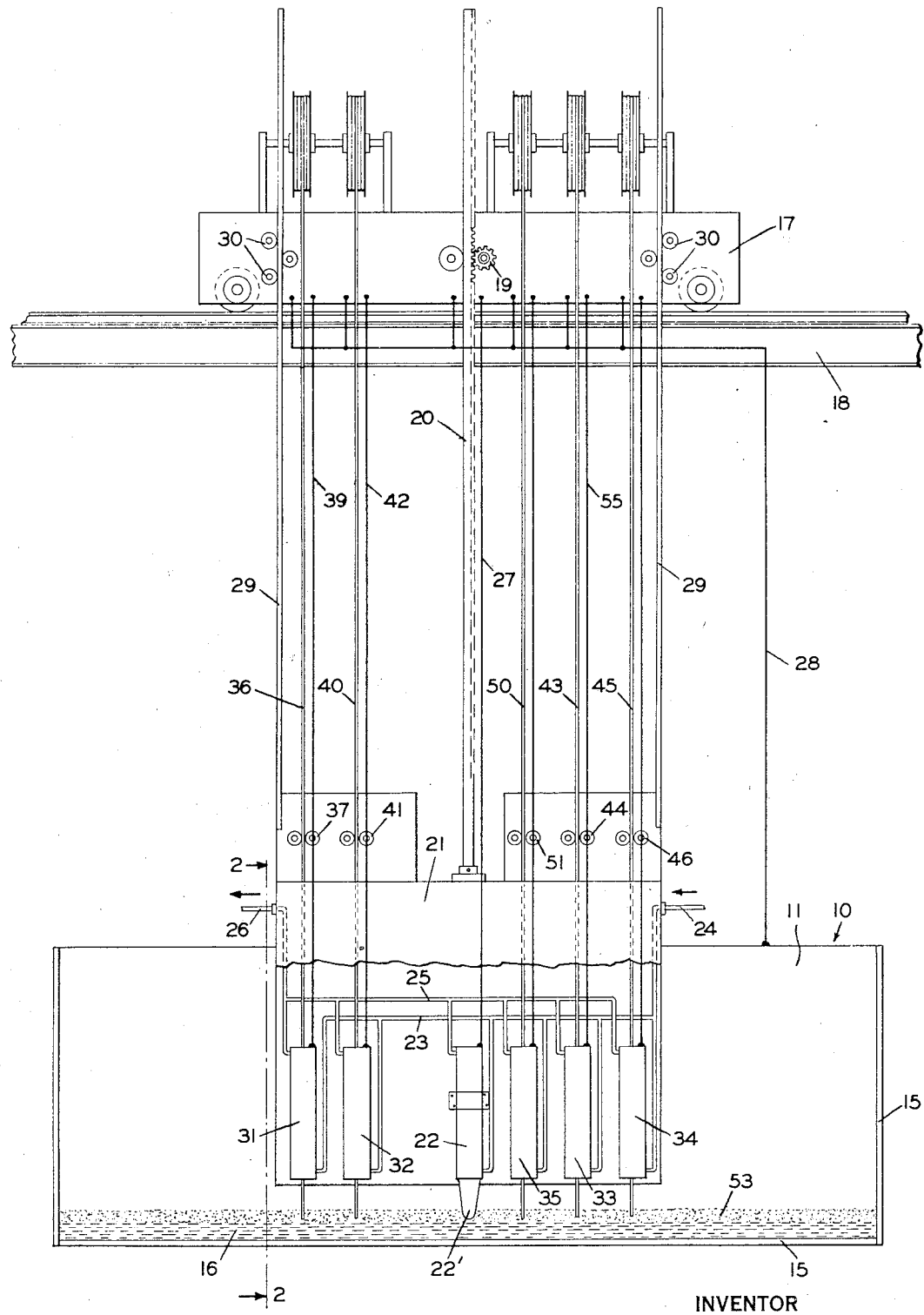
Figure 2:
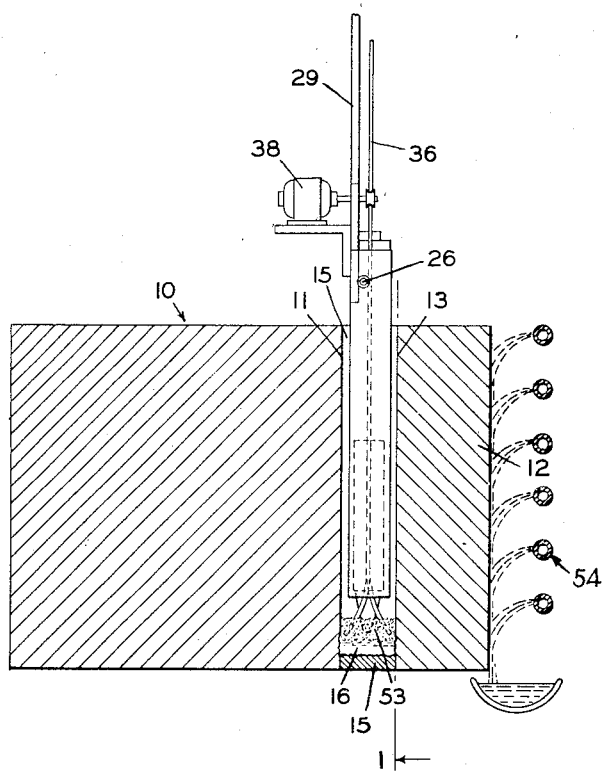
Fig. 2 is a fragmentary sectional view taken on line 2—2 of Fig. 1.

The novel method of this invention may be employed in the manufacture of coated articles of a wide range of composition. The base metal may be carbon steel, iron or any of the metals and alloys, both ferrous and non-ferrous, commonly used in the manufacture of machines, apparatus, vessels, containers, structural members, etc. The coating metal may be of any ferrous or non-ferrous metal or alloy such as chrome-steel, manganese steel, chrome-nickel steel, Monel metal etc., having corrosion or oxidation, or wear, or other resisting property superior to that of the chosen base metal in the intended service. The articles produced by my novel method though composite are in fact unitary structures and, hence, are admirably suited to withstand the severest service conditions, as for instance, those encountered in the petroleum processing arts where corrosive media are handled at temperatures in excess of 1000° F. under pressures in excess of 1000 lbs. per square inch. The preferred base metal for this class of service will usually be plain carbon steel or carbon molybdenum steel or chrome-molybdenum carbon steel; the coating metal will usually be chrome steel, chrome-nickel steel, Monel metal, etc.

The novel method may be employed for manufacturing coated articles that are substantially in their finished form after the coating operation or it may be employed for manufacturing intermediate articles or workpieces such as ingots, slabs, billets and the like from which the final articles are produced by working operations such as forging, rolling, etc. The articles may be produced in the form of flat members such as slabs, plates, etc., or shaped members such as angles, channels, and similar shaped forms, or they may be produced as solid cylinders such as bars or hollow cylinders such as tubes.

To form a composite article in accordance with my invention the base metal in the form of an ingot, billet, slab, etc., is positioned with its surface to be coated disposed vertically or substantially so. All or a portion of the coating metal in a form to offer a surface substantially identical with the surface to be coated is then positioned adjacent the base metal. Molten metal is deposited in the space between the base metal and the coating metal to fill said space. Simultaneously with the deposition of the molten metal a controlled depth of the metal of the base and a controlled depth of the metal of the coating are fused at substantially the level of the molten metal so that the metals thus fused intermingle with the deposited metal to integrally unite the base metal, the deposited metal and the coating metal. To assure a perfect union and clean metal the operation is carried out by electric current discharge beneath a blanket of protecting flux.

Because of the size of the base metal and coating metal bodies the space in which the molten metal is to be deposited is many times the height of the usual welding groove. Hence, in order to successfully carry out the operation, the space must be much wider than the usual welding groove. The width of the space will vary but in practice it is always of such a width that a single electrode placed between the surfaces cannot be depended upon to fuse metal of the base as well as metal of the coating. To assure the fusion of a predetermined depth of both the base and the coating metals electric current is discharged from separate electrodes against or adjacent each of the surfaces and these electrodes raised with the rising level of the metal in the space to maintain a fixed positional relation therebetween. In order to further assure the desired fusion throughout the surfaces, a continuous band or zone of each of the surfaces is continually maintained in the fused condition. This is accomplished by providing closely spaced electrodes along the full length of the space, or by providing electrodes that are movable back and forth along the length of the space and moving these electrodes at the proper rate to maintail the metal for the full length of the space at the liquid metal level in the molten condition. This, of course, also serves to maintain the deposited metal molten in the full length of the space.

The deposition of the molten metal while continuous takes place over a considerable period of time so that the solidification of the deposited metal commences before its deposition is ended. Thus, there is a progressive solidification from the bottom upwards and except at the very top there is always molten metal above the solidifying metal. For this reason shrinkage defects can only occur at the top of the deposited metal, and by a proper control of the deposition, even these can be kept to a minimum.

The deposited metal may be such that when intermingled with the metal fused from the base and from the coating it will result in metal of the same, or substantially the same, composition as the coating, or it may be such as to result in metal substantially the same or closely approximating the metal of the base. Also, the deposited metal may be such that it will result in metal of different composition from both the coating and the base.

In practice a body of base metal 10, which may be a slab, ingot, billet or the like is positioned with its surface 11, to which the coating metal 12 is to be united, vertically disposed. The vertical dimension of surface 11 may range from a foot or less to five or six feet and more. The coating metal 12 may be in the cast condition or in the worked or partly worked condition; worked or partly worked metal is preferred. Coating metal 12 is shaped to provide a surface 13 substantially identical to surface 11. Coating metal 12 may contain all or substantially all of the coating metal or it may only contain a small part of it; thus, it may range in thickness for around ½ inch, or less, to a foot or more. Metal 12 is positioned relative to metal 10 to provide a space 14 therebetween into which the molten metal is deposited. Space 14 may be as much as a foot or more in width or it may be as narrow as is conveniently possible. Thus far it has not been possible to operate successfully with a space 14 much less than 2 inches in width when the vertical dimension of surface 11 is one foot or more. In any case the practical width of space 14 is such that proper and simultaneous fusion of metal of base 10 and coating 12 cannot be obtained by discharging a single electrode between them. After the metals 10 and 12 are juxtaposed the sides and bottom of space 14 are closed by metal strips 15. These strips are preferably welded to base 10 and coating 12.

Metal 16 is then deposited into space 14 and the opposed surfaces of metals 10 and 12 fused to a controlled depth whereby the deposited metal and the fused metals intermingle to unite, upon solidification, metals 10 and 12 into an integral structure. Metal 16 may be supplied entirely from metal electrodes under the influence of an electric current discharge, or it may be supplied in part from electrodes and in part from a suitable molten metal source, or also it may be supplied in part by electrodes and in part by the fusion of solid metal positioned in the vicinity of the electrodes. By choosing a source or sources of deposited metal of proper composition a metal 16 may be obtained that has substantially the same composition as the coating metal 12, or a composition approximating that of metal 10, or a composition different from either of these metals.

The apparatus diagrammatically shown in the drawings is at present preferred for carrying out the metal fusing and depositing operation. This apparatus includes a head 17 mounted for back and forth movement on a bridge 18. The movement may be effected manually or automatically.

Head 17 houses the current generators, or current connections to an outside source, for the electrodes to be hereinafter described, the arrangements for controlling the electrode feed motors, i. e., the usual devices for controlling the electrode feed motors to maintain a discharge of predetermined length, and the motor and control arrangements for driving gear wheel 19. Gear wheel 19 drives rack 20 that is attached to member 21 to raise and lower member 21 to maintain the discharge from the end of non-consumable electrode 22 substantially constant. Electrode 22 is fixed to member 21 and includes a jacketed upper portion the bottom of which is connected to manifold 23 of water inlet line 24 and the top of which is connected to manifold 25 of water outlet line 26. Electrode 22, or at least its discharge end, 22′ is made of a metal of high heat conductivity such as copper, or of some substantially non-consumable metal such as tungsten. One side of the current supply for non-consumable electrode 22 is connected to portion 22 through cable 27 while the other side is connected through ground cable 28 to metal 10, or metal 12. Guide bars 29 that pass between rollers 30 are attached to member 21 to assure an even movement thereof with electrode 22.

Figure 3:
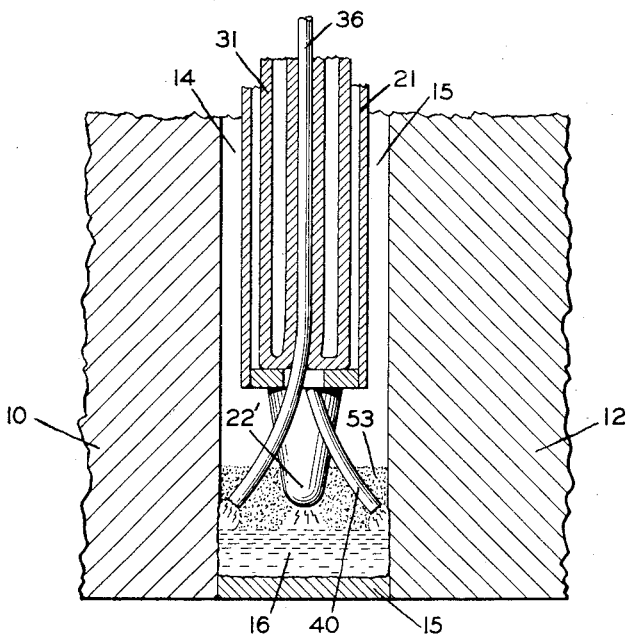
Fig. 3 is an enlarged fragmentary sectional view of a detail of the apparatus.

Member 21 also carries supported near its bottom jacketed contact devices 31, 32, 33 and 34 as well as jacketed contact device 35. Each of these contact devices has its bottom connected to a branch of water inlet manifold 23 and its top connected to a branch of water outlet manifold 25. One of these contact devices, device 31, is shown in section in Fig. 3. As shown, device 31 is provided with a water circulation passageway and a passageway through which the electrode 36 passes. Electrode 36 is driven through the passageway last mentioned, by feed wheel 37 that is actuated by feed motor 38 that is controlled by the control arrangements previously mentioned. Electrode 36 in passing through contact device 31 is bent as shown toward surface 11. One side of the current supply for electrode 36 is connected to contact device 31 through cable 39 while the other side is grounded through cable 28. Contact device 32 is identical with device 31 but its electrode 40 is directed toward the surface 13. Electrode 40 is driven by feed roller 41 from a feed motor, not shown, that is likewise controlled through the control arrangements previously mentioned. Contact device 32 is connected to the current supply for electrode 40 through cable 42. This current supply is also grounded through cable 28. Contact device 33 is identical with device 31 while contact device 34 is identical with device 32. The electrode 43 is fed through device 33 by feed wheel 44 driven by a motor not shown that is also controlled by the control arrangements previously mentioned. One side of the current supply for electrode 43 is connected to device 33 through cable 55, the other side is grounded by cable 28. The electrode 45 is driven through device 34 by feed wheel 46 driven by a motor not shown that is also controlled by the control arrangements previously mentioned. Contact devices 31, 32, 33 and 34 are shown as aligned, however, they may be staggered or otherwise arranged, the requirement being that they be spaced so that one group of them will direct their electrodes into such close proximity with one of the vertical surfaces and the other group will direct their electrodes in such close proximity with the other vertical surfaces that a predetermined depth or depths of the surfaces will be fused by the electrical discharges from the ends of the electrodes. While four such surface fusing electrodes have been shown a smaller or a larger number may be used as required.

Motor 38 and the feed motors for electrodes 40, 43 and 45 are located on the top of member 21 so as to have them as close as possible to their associated contact devices and thus avoid buckling of the electrodes and interference with their feed. To obtain this result the contact devices, especially when the electrodes are in the form of thin wires, may be made longer than shown and may even extend to the top of member 21.

Electrode 50 is passed to the work through contact device 35 by feed wheel 51 that is driven by a motor mounted on top of member 21. The motor is controlled by the control arrangements previously mentioned, to maintain a substantially constant discharge. Electrode 50 is not bent in its passage through contact device 35 so that its end is substantially vertical. Current is supplied to contact device 35 by cable 56, the other side of the supply is grounded by cable 28.

Electrode 50 may be a wire, rod, or of any other preferred form, it may also be either solid or hollow. When electrode 50 is hollow any desired alloy constituent may be passed through it at controlled rates to modify as desired the composition of metal 16. While only one electrode 50 has been shown any number of them may be employed.

If desired also, one or more of electrodes 50 may be provided that may be termed dead electrodes, i. e., this electrode, or electrodes, will be unconnected to a current source and will be fused by the heat generated by the side fusing electrodes. This electrode, or electrodes, will usually be fed at a constant speed. By use of dead electrodes the heat generated by the live electrodes may be more efficiency used, and the amount of superheat controlled.

To initiate the surface fusing and metal depositing operation member 21 is lowered in space 14 until all of the electrodes approach either metal 15 or sides 11 and 13. Arc-starters, such as wads of steel wool, etc., are then placed between the electrodes and the metal they approach. Flux blanket 53 is then placed on the bottom of space 14 until all of the bottom and all of the ends of the electrodes are completely covered. Flux may be added from time to time during the operation. The electrical circuits are then closed and the operation begun. Head 17 is then caused to move back and forth at a uniform rate; the rate of movement being such as to give a uniform depth of fusion into the metal of faces 11 and 13, and an uninterrupted zone of fused metal at both faces for the full width thereof at the level of metal 16.

Flux 53 should be such that it will not liberate deleterious gas, either as to quantity or kind, and furthermore, should be such that it will not add substantial quantities of undesirable ingredients to or remove desirable ingredients from the molten metal but will flux out impurities. A wide variety of fluxes may be used satisfactorily. Silicates, in general, either simple silicates and mixtures thereof, or complex silicates and mixtures thereof are satisfactory. Aluminates, titanates and similar compounds are likewise satisfactory and may also be used in mixture with silicates. The flux may also include thinning compounds such as feldspar and the like. The flux need not be composed of reacted materials but may be made up of their dried or calcined unreacted components. At present, silicates of the alkaline earth metals, and manganese, aluminum, and iron are preferred as fluxes.

As the current discharges, metal of the surfaces 11 and 13 as well as metal of the electrodes are fused, these metals intermingle to give a metal 16 of uniform composition which upon cooling and solidifying unites metals 10 and 12 into an integral structure. To obtain this result it is necessary that the surface fusing electrodes discharge substantially constantly at or adjacent the meeting lines of metal 16 and surface metal 11 and metal 16 and surface metal 13. By properly designing the contact nozzles of the surface fusing electrodes this is obtained initially and, since rack 20 raises member 21 to maintain a constant spacing between it and metal 16, this is obtained throughout the deposition.

Due to the heat absorbing capacity of metal 10 and 12 all of metal 16 does not remain in the molten condition until the end of the operation but solidifies progressively upwardly as the deposition advances. Thus, the metal as it solidifies has molten metal above it and no shrinkage voids and other defects can develop in it. Defects may be kept to a minimum or eliminated entirely even from the top metal 16 by reducing the rate of deposition and travel towards the end of the operation so that only a minimum of molten metal is present when the top is reached.

To accelerate the solidification of the deposited metal as well as to aid in maintaining a constant penetration into metals 10 and 12 it is sometimes preferred to cool metals 10 and 12, either or both, as by the water spray 54 shown or other similar means.

After the operation is finished the composite article may be used as such or converted into worked articles as by rolling, forging, etc.

While the invention has been described in connection with the manufacture of composite articles the metals of which are of different composition it is not limited to such manufacture. Thus, the invention may be used satisfactorily in the union of metal members of the same or different composition by welding. In the latter application it is of real value as an extremely deep groove can be filled in a single continuous operation. Thus, eliminating flux removal, peening, chipping and similar laborious and expensive operations. Also, such a weld would be free from the stresses that usually appear in a discontinuous multi-pass weld. This follows from the fact that during the metal depositing operation the surface metal for the full length of the groove is in the molten condition. Thus, solidification is progressively upward rather than progressively along the length of the groove as in the prior practice. Furthermore, welds of much greater width than is now possible can be made with complete union and dense metal throughout.

I claim:

1. The method of uniting metal bodies which comprises, positioning a pair of metal bodies to provide a space between non-horizontally disposed surfaces of the bodies; depositing molten metal in said space to fill said space and to progressively cover said spaced surfaces; and, simultaneously with the molten metal deposition, fusing a depth of the metal bodies defining said surfaces at substantially the zones of contact between the rising level of the deposited metal and said surfaces, whereby molten metal derived from both of the bodies intermingles with the molten deposited metal into a common mass which upon solidification unites the bodies, the molten metal derived from said bodies being fused directly by electric current discharged through gaps maintained at the zones of contact between the rising level of the deposited metal and said spaced surfaces, the deposited metal and said gaps being protected from the atmosphere during the operation.

2. The method of uniting metal bodies which comprises, positioning a pair of metal bodies to provide a space between non-horizontally disposed surfaces of the bodies; depositing molten metal in said space to fill said space and to progressively cover said spaced surfaces; and, simultaneously with the molten metal deposition, discharging electric current from the ends of electrodes directed towards said spaced surfaces and maintained to provide gaps between their ends and the zones of contact between the rising level of the deposited metal and said spaced surfaces thereby to fuse directly a depth of metal of each of the bodies in said zones, the deposited metal and said gaps being maintained beneath the surface of a protective blanket of flux during the operation.

3. The method of uniting metal bodies which comprises, positioning a pair of metal bodies to provide a space between substantially vertically disposed surfaces of the bodies, providing a blanket of protective flux in the bottom of said space, depositing molten metal in said space beneath the surface of the blanket of flux to fill said space and to progressively cover said spaced surfaces, the metal deposition being so carried out that the surface of the deposited metal is molten across the full width of said space throughout the operation, and discharging electric current beneath the surface of the flux blanket from the ends of metal electrodes directed and maintained to provide gaps between their ends and the zones of contact between the rising level of the deposited metal and said spaced surfaces to thereby fuse directly by the heat of the discharges a depth of the metal of each of said bodies at substantially the rising level of the deposited metal, which fused metal intermingles with the deposited metal into a common mass.

4. The method of uniting metal bodies which comprises, positioning a pair of metal bodies to provide a space between substantially vertically disposed surfaces of the bodies, providing a blanket of protective flux in the bottom of said space, depositing molten metal in said space beneath the surface of the blanket of flux to fill said space and to progressively cover said spaced surfaces, the metal deposition being so carried out that the surface metal of the deposited metal is molten throughout its extent during the operation, discharging electric current beneath the surface of the flux blanket from the ends of metal electrodes directed and maintained to provide gaps between their ends and the zones of contact between the rising level of the deposited metal and said spaced surfaces to thereby fuse directly by the heat of the discharges a depth of metal of each of said bodies, and moving said electrodes back and forth along said zones to present continuous bands of molten metal at each of said spaced surfaces to the rising molten deposited metal, and adjusting the composition of the deposited metal and said electrodes to form a molten mass of metal of desired analysis which upon solidification unites said bodies.

ROBERT K. HOPKINS.